(12) United States Patent
Kim et al.

(10) Patent No.: US 7,717,603 B2
(45) Date of Patent: May 18, 2010

(54) LIGHT GUIDE PLATE HAVING MULTI-PERIODIC PATTERNS AND ILLUMINATION APPARATUS FOR DISPLAY DEVICE USING THE LIGHT GUIDE PLATE

(75) Inventors: Jin-hwan Kim, Suwon-si (KR); Hong-seok Lee, Seongnam-si (KR); Jin-Seung Choi, Suwon-si (KR); Jee-hong Min, Yongin-si (KR); Jae-ho You, Seoul (KR); Kyung-yeup Kim, Yongin-si (KR); Su-mi Lee, Hwaseong-si (KR); Yoon-sun Choi, Incheon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 129 days.

(21) Appl. No.: 11/287,350

(22) Filed: Nov. 28, 2005

(65) Prior Publication Data

US 2006/0279963 A1  Dec. 14, 2006

(30) Foreign Application Priority Data

Jun. 8, 2005 (KR) .................. 10-2005-0048861

(51) Int. Cl.
*F21V 7/04* (2006.01)
(52) U.S. Cl. .................. 362/619; 362/561; 362/97.1
(58) Field of Classification Search ............. 362/619, 362/561, 610, 618, 612, 620, 555, 26, 30, 362/97.1, 97.2
See application file for complete search history.

(56) References Cited

U.S. PATENT DOCUMENTS

| | | | | |
|---|---|---|---|---|
| 3,891,302 A | * | 6/1975 | Dabby et al. ............... 385/37 |
| 4,775,980 A | * | 10/1988 | Chinone et al. ............ 372/96 |
| 5,126,882 A | * | 6/1992 | Oe et al. ................... 359/619 |
| 5,394,255 A | * | 2/1995 | Yokota et al. ................. 349/64 |
| 5,771,328 A | * | 6/1998 | Wortman et al. ........... 385/146 |
| 5,919,551 A | * | 7/1999 | Cobb et al. ................. 428/156 |
| 5,999,685 A | * | 12/1999 | Goto et al. ................. 385/146 |
| 6,339,458 B1 | * | 1/2002 | Ohkawa ..................... 349/65 |
| 6,414,735 B1 | * | 7/2002 | Kim et al. .................. 349/113 |
| 6,576,887 B2 | * | 6/2003 | Whitney et al. ........ 250/227.11 |
| 6,578,977 B2 | * | 6/2003 | Egawa et al. ............... 362/610 |
| 6,669,349 B2 | * | 12/2003 | Mabuchi ................... 362/628 |
| 6,692,133 B2 | * | 2/2004 | Katsu et al. ................ 362/620 |
| 6,693,683 B2 | * | 2/2004 | Ishitaka ..................... 349/65 |
| 6,752,505 B2 | * | 6/2004 | Parker et al. ............... 362/627 |
| 6,863,414 B2 | * | 3/2005 | Ho ........................... 362/603 |

(Continued)

FOREIGN PATENT DOCUMENTS

KR  10-2004-0063385 A  7/2004

*Primary Examiner*—Gunyoung T Lee
(74) *Attorney, Agent, or Firm*—Sughrue Mion, PLLC

(57) ABSTRACT

A light guide plate having a multi-periodic micro pattern, which can minimize chromatic dispersion, and an illumination apparatus for a display device employing the light guide plate are provided. The light guide plate includes a top surface and a micro pattern formed on the top surface and allowing light, which is incident from a first side surface of the light guide plate, to be emitted from the top surface. The micro pattern is a combination of at least two periodic patterns having different periods to reduce chromatic dispersion of light emitted from the top surface.

20 Claims, 6 Drawing Sheets

U.S. PATENT DOCUMENTS

| | | | |
|---|---|---|---|
| 7,009,771 B2 * | 3/2006 | Bourdelais et al. | 359/599 |
| 7,018,061 B2 * | 3/2006 | Chen | 362/619 |
| 7,180,690 B2 * | 2/2007 | Nagao | 359/837 |
| 7,320,535 B2 * | 1/2008 | Etori | 362/335 |
| 2003/0214719 A1 * | 11/2003 | Bourdelais et al. | 359/599 |
| 2007/0053030 A1 * | 3/2007 | Hoshino et al. | 359/15 |

* cited by examiner

LIGHT GUIDE PLATE HAVING MULTI-PERIODIC PATTERNS AND ILLUMINATION APPARATUS FOR DISPLAY DEVICE USING THE LIGHT GUIDE PLATE

CROSS-REFERENCE TO RELATED PATENT APPLICATION

This application claims priority from Korean Patent Application No. 10-2005-0048861, filed on Jun. 8, 2005, in the Korean Intellectual Property Office, the disclosure of which is incorporated herein in its entirety by reference.

BACKGROUND OF THE INVENTION

1. Field of the Invention

Apparatuses consistent with the present invention relate to a light guide plate and an illumination apparatus for a display device using the light guide plate, and more particularly, to a light guide plate having multi-periodic micro patterns, which can minimize chromatic dispersion, and an illumination apparatus for a display device using the light guide plate.

2. Description of the Related Art

In general, non-emissive displays such as liquid crystal displays (LCDs), typically require illumination apparatuses such as backlight units. FIG. 1 is a cross-sectional view of a conventional illumination apparatus for a display device, the illumination apparatus including a hologram-based light guide plate. Referring to FIG. 1, a conventional illumination apparatus 10 for a display device includes a light guide plate 12 having a top surface on which a micro pattern 13 is formed, a light source 11 disposed at a side of the light guide plate 12, and a light diffuser sheet 15 uniformly diffusing light emitted from the top surface of the light guide plate 12.

A white light emitting diode (LED) is generally used as a light source 11 of the illumination apparatus 10 for the display device. White light emitted from the light source 11 is obliquely incident on a first side surface of the light guide plate 12, which is formed of polymethyl methacrylate with high light transmittance, adjacent to the light source 11. The incident white light is totally reflected by the top surface and a bottom surface of the light guide plate 12 and then propagates to a second side surface of the light guide plate 12 opposite to the first side surface. Since the micro pattern 13 is formed on the top surface of the light guide plate 12 as illustrated in FIG. 1, some of the light incident on the top surface of the light guide plate 12 is diffracted by the micro patterns 13 to be emitted from the top surface of the light guide plate 12. The micro pattern 13 may be sinusoidally shaped and having a predetermined period. The light emitted from the top surface of the light guide plate 12 is uniformly diffused by the diffuser sheet 15, and illuminates a non-emissive display such as a liquid crystal display (LCD).

Since the light is composed of components with different refractive indices and transmittance, chromatic dispersion occurs when the light is emitted from the top surface of the light guide plate 12 through the micro pattern 13.

FIGS. 2A through 2C are diagrams for explaining chromatic dispersion. Luminance distributions of red (R) light, green (G) light, and blue (B) light among light emitted from the light guide plate 12 were measured. The micro patterns 13 had a period of 420 nm and a thickness of 250 nm. It was assumed that the red (R) light, the green (G) light, and the blue (B) light had wavelengths of 620 nm, 540 nm, and 450 nm, respectively. The width of the white light beam was 4 μm, and the white light was incident on the top surface 12 at an angle of 60°.

FIG. 2A illustrates luminance distribution of the red (R) light. The red (R) light was mostly distributed close to a central point. FIG. 2B illustrates luminance distribution of the green (G) light. The green (G) light was also distributed close to the central point but the brightest portion was located at a short distance from the central point. FIG. 2C illustrates luminance distribution of the blue (B) light. The brightest portion was located at a long distance from the central point. Accordingly, luminance distributions of light are different depending on the colors of light.

FIG. 3 is a graph illustrating a relationship between luminance distributions of the red (R) light, the green (G) light, and the blue (B) light and angles at which the light is emitted. Chromatic dispersion might be more clearly understood from the graph of FIG. 3. Here, the angles at which the light was emitted were measured from an imaginary reference line perpendicular to the top surface of the light guide plate 12. Referring to FIG. 3, the blue (B) light was distributed around an angle of about 22°, which is called a peak angle. That is, the blue (B) light was emitted from the light guide plate 12 at the peak angle of about 22°. The green (G) light was emitted from the light guide plate 12 at a peak angle of about 8°, and the red (R) light was emitted from the light guide plate 12 at a peak angle of about 4°.

Accordingly, since the blue (B) light, the green (G) light, and the red (R) light were emitted from the light guide plate 12 at different peak angles, the white light emitted from the point light source 11 was separated into colors by the light guide plate 12, thereby leading to chromatic dispersion. Even though the light subjected to the chromatic dispersion is uniformly diffused by the diffuser sheet 15, the light cannot be perfect white light. As a result, since the light incident on the display device is not white light but rather specific colors of light, the performance of the display device is degraded.

SUMMARY OF THE INVENTION

The present invention provides a light guide plate having a multi-periodic micro pattern, which can minimize chromatic dispersion.

The present invention also provides an illumination apparatus, which uses the light guide plate, for a display device with high chromaticity and luminance.

According to an exemplary aspect of the present invention, there is provided a light guide plate comprising: a top surface; and a micro pattern formed on the top surface and allowing light, which is incident from a side surface of the light guide plate, to be emitted from the top surface, wherein the micro pattern is a combination of at least two periodic patterns having different periods to reduce chromatic dispersion of the light emitted from the top surface.

The micro pattern may comprise an enveloping surface formed along outermost edges of the at least two periodic patterns.

The micro pattern may comprise a surface formed by overlapping and summing the at least two periodic patterns.

The micro pattern may comprise a surface formed by overlapping and inverting the at least two periodic patterns.

The at least two periodic patterns may be sinusoidal patterns.

The light guide plate may further comprise a reflective plate disposed adjacent to a side surface of the light guide plate opposite to the side surface of the light guide plate from which the light is incident, the reflective plate reflecting light which is not emitted from the top surface of the light guide plate but is emitted from the side surface of the light guide plate.

According to another aspect of the present invention, there is provided an illumination apparatus for a display device, the illumination apparatus comprising: a light guide plate having a top surface on which a micro pattern is formed to emit light incident from a side surface of the light guide plate from the top surface; at least one light source disposed at a side of the light guide plate, and emitting light; wherein the micro pattern is a combination of at least two periodic patterns having different periods to reduce chromatic dispersion of the light emitted from the top surface of the light guide plate.

The micro patterns may comprise an enveloping surface formed along outermost edges of the at least two periodic patterns.

The micro patterns may comprise a surface formed by overlapping and summing the at least two periodic patterns.

The micro patterns may comprise a surface formed by overlapping and inverting the at least two periodic patterns.

The at least two periodic patterns may be sinusoidal patterns.

The illumination apparatus may further comprise a reflective plate disposed adjacent to a side surface of the light guide plate opposite to the side surface of the light guide plate close to the light source, the reflective plate reflecting light which is not emitted from the top surface of the light guide plate but is emitted from the side surface of the light guide plate.

The illumination apparatus may further comprise a diffusion plate facing the top surface of the light guide plate and uniformly diffusing the light emitted from the top surface of the light guide plate.

The light source may be a white light emitting diode (LED).

BRIEF DESCRIPTION OF THE DRAWINGS

The above and other aspects of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 4A:
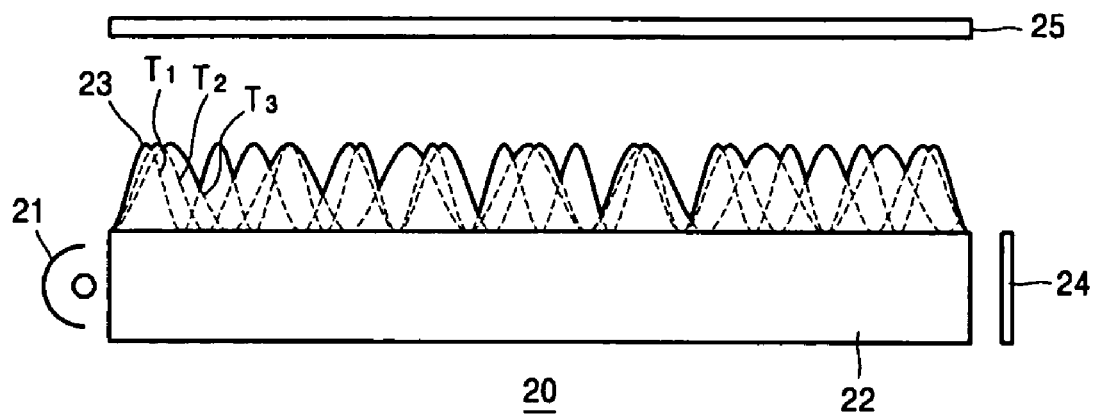
FIG. 4A is a cross-sectional view of a light guide plate and an illumination apparatus for a display device according to an exemplary embodiment of the present invention.

FIG. 4A is a cross-sectional view of a light guide plate and an illumination apparatus for a display device according to an exemplary embodiment of the present invention. Referring to FIG. 4A, an illumination apparatus 20 for a display device includes a light guide plate 22 having a top surface on which a micro pattern 23 is formed, a light source 21, disposed at a side of the light guide plate 22, which emits light, and a diffusion plate 25, disposed over the light guide plate 22, which uniformly diffuses light emitted from the micro pattern 23.

The micro pattern may be added to the top surface of the light guide plate 22, or may be formed into the top surface, thus resulting in a single, integral light guide having a micro pattern as a top surface thereof.

A white light emitting diode (LED) may be used as the light source 21. Although one light source 21 is illustrated in FIG. 4A, a plurality of light sources 21 may be aligned along the side of the light guide plate 22.

The light guide plate 22 may be made of polymethyl methacrylate (PMMA) with high light transmittance. The micro pattern 23 22 diffracts light which is obliquely incident on the top surface of the light guide plate 22. Then, the light is emitted from the micro pattern 23. Referring to FIG. 4A, a reflective plate 24 may be disposed at a side of the light guide plate 22 opposite to the side adjacent to the light source 21. The reflective plate 24 reflects light, which is not emitted from the top surface of the light guide plate 22 but which propagates through the light guide plate 22 and reaches the side of the light guide plate 22 opposite to the side adjacent to the light source 21. The light reflected by the reflective plate 24 is incident again onto the light guide plate 22, and then is diffracted by the micro pattern 23. The light emitted from the micro pattern 23 can be uniformly diffused by the diffusion plate 25 that faces the top surface of the light guide plate 22.

The micro pattern 23, which reduces chromatic dispersion of light emitted from the top surface of the light guide plate 22 may be a combination of at least two patterns having different periods. For example, the micro pattern 23 may be a combination of sinusoidal patterns which have periods of 460 nm, 390 nm, and 310 nm, respectively, and the same thickness of 250 nm. In this case, light obliquely incident on the top surface of the light guide plate 22 is respectively diffracted by a first pattern having a first period $T_1$, a second pattern having a second period $T_2$ and a third pattern having a third period $T_3$, and is emitted from the micro pattern 23. Angles at which the light is diffused by the first through third patterns are different depending on periods of the first through third patterns, respectively. Accordingly, chromatic dispersion caused by the patterns can be offset by appropriately selecting the periods $T_1$, $T_2$, and $T_3$ of the first through third patterns.

Figure 5:
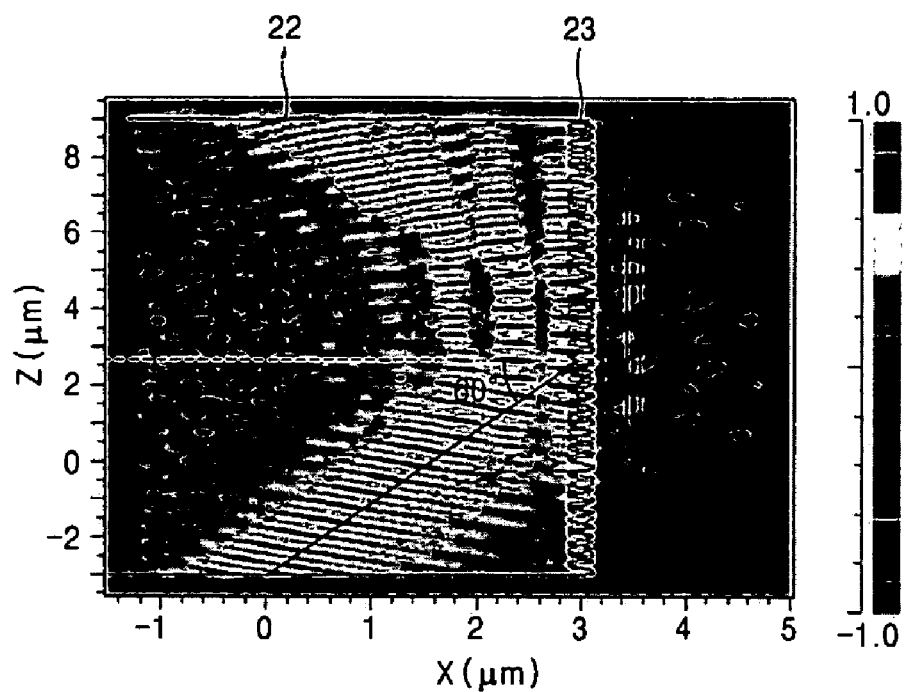
FIG. 5 shows simulation conditions for simulating the performance of a light guide plate according to an exemplary embodiment of the present invention.

In order to ascertain that chromatic dispersion can be offset using a combination of micro patterns having different periods, simulations using a finite-difference time-domain (FDTD) have been conducted. As shown in FIG. 5, a simulation was conduced in which red (R) light with a wavelength of 620 nm, green (G) light with a wavelength of 540 nm, and blue (B) light with a wavelength of 450 nm were incident on the top surface of a light guide plate at an angle of 60°. In this case, a micro pattern comprising a combination of sinusoidal patterns having different periods was formed on the light guide plate. The simulations were conducted by changing the number and periods of the sinusoidal patterns.

Figure 6:
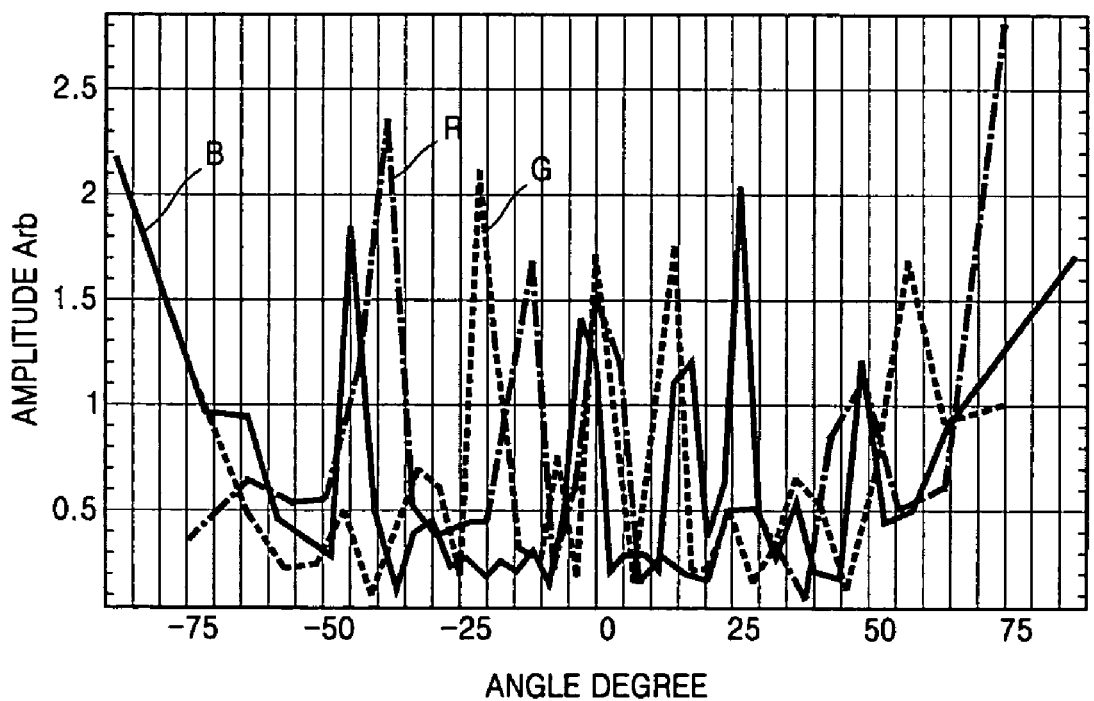
FIGS. 6 through 8 are graphs illustrating simulation results when the period and the number of micro patterns used in FIG. 5 are changed.
Figure 7:
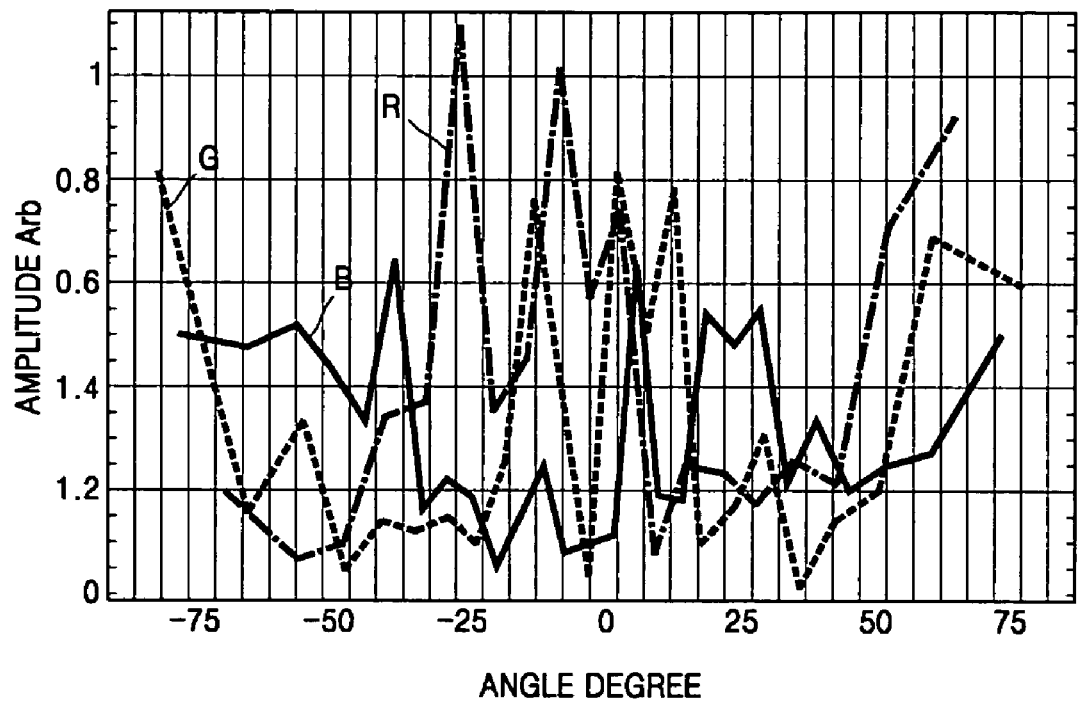
Figure 8:
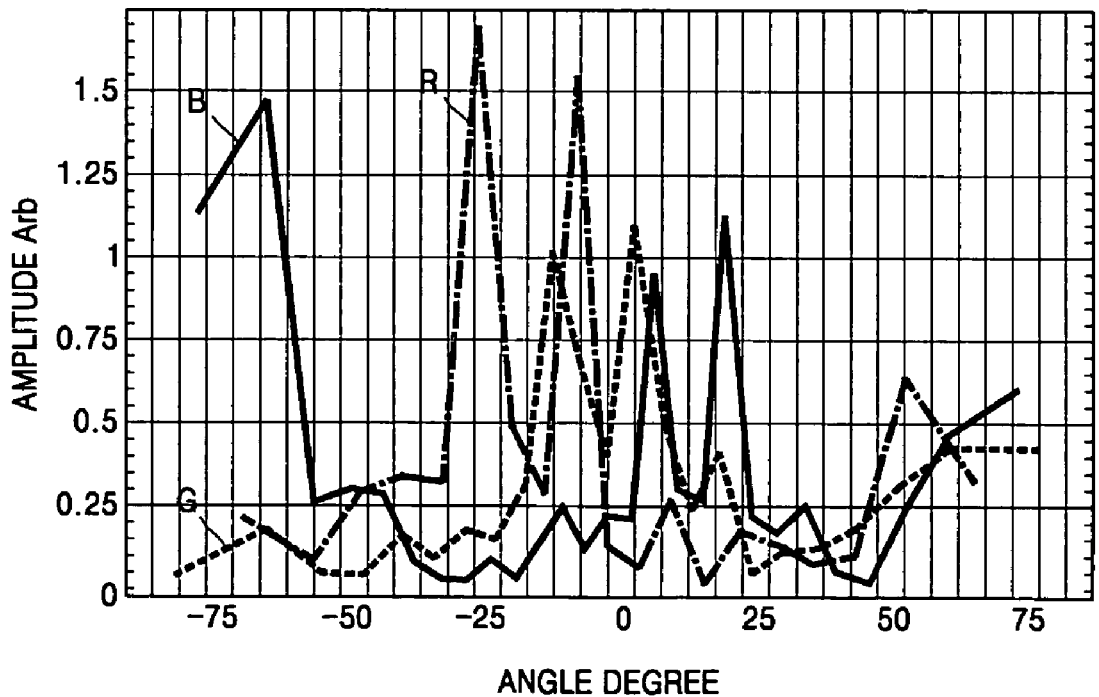

FIGS. 6 through 8 are graphs illustrating simulations results when the period and number of the sinusoidal patterns used in FIG. 5 are changed.

Figure 1:
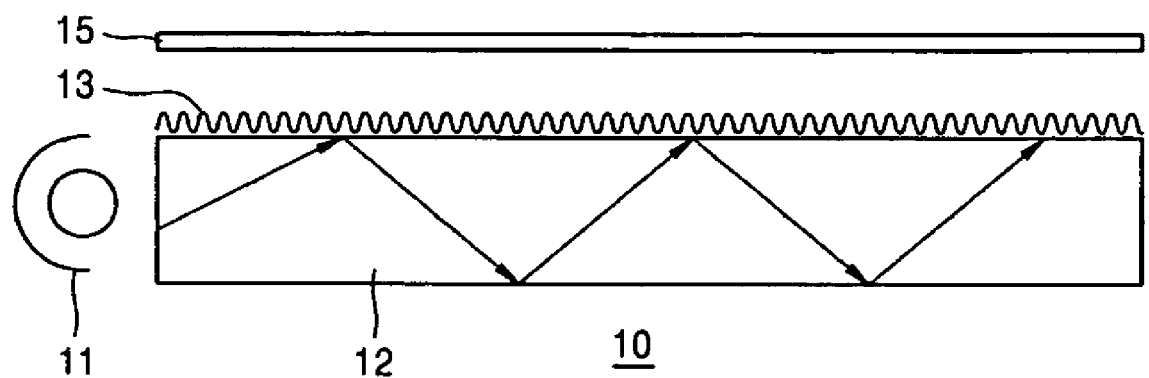
FIG. 1 is a cross-sectional view of a conventional illumination apparatus for a display device using a light guide plate.
Figure 2A:
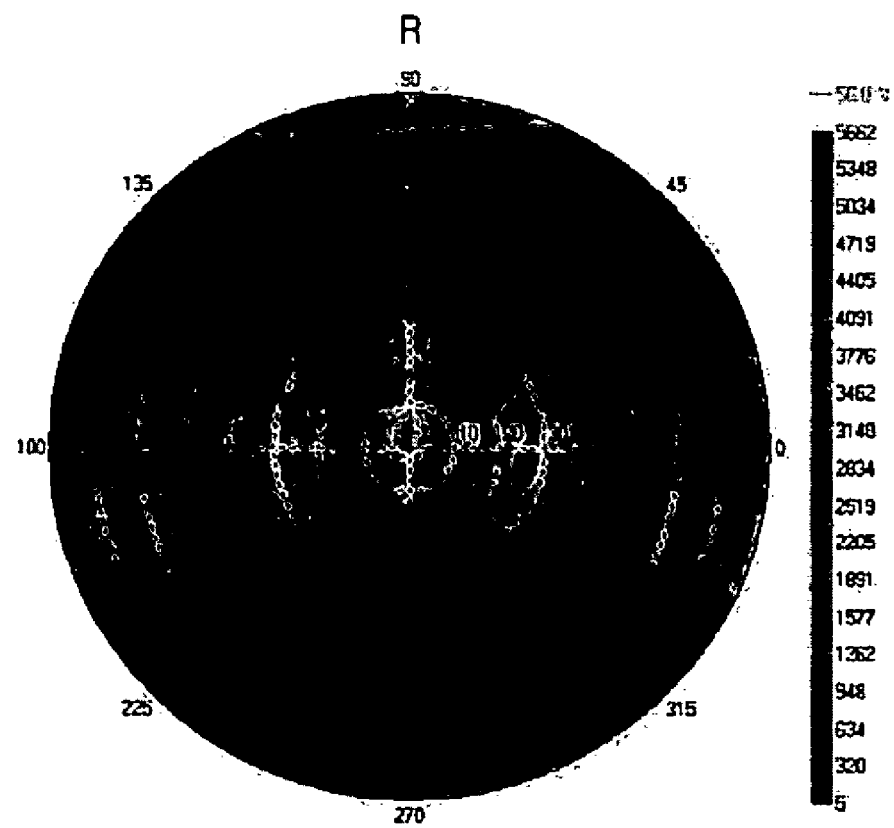
FIGS. 2A through 2C illustrate luminance distributions of red (R) light, green (G) light, and blue (B) light, respectively, among light emitted from the light guide plate of FIG. 1.
Figure 2B:
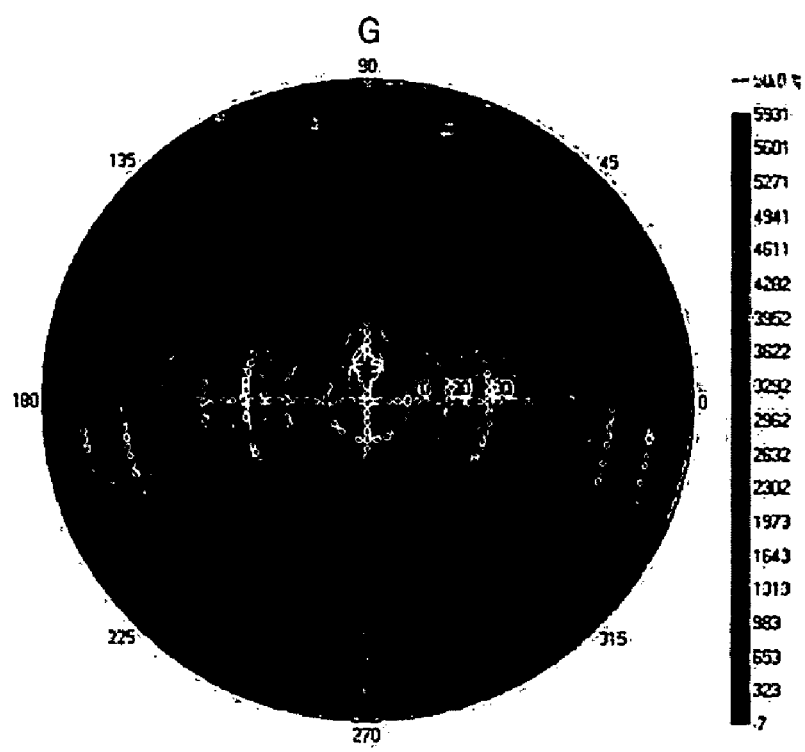
Figure 2C:
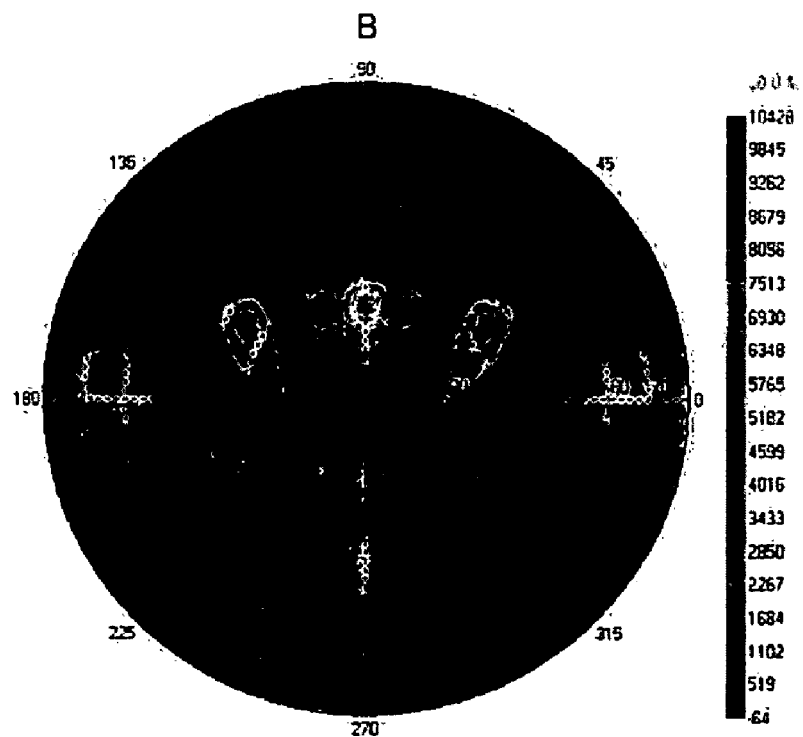
Figure 3:
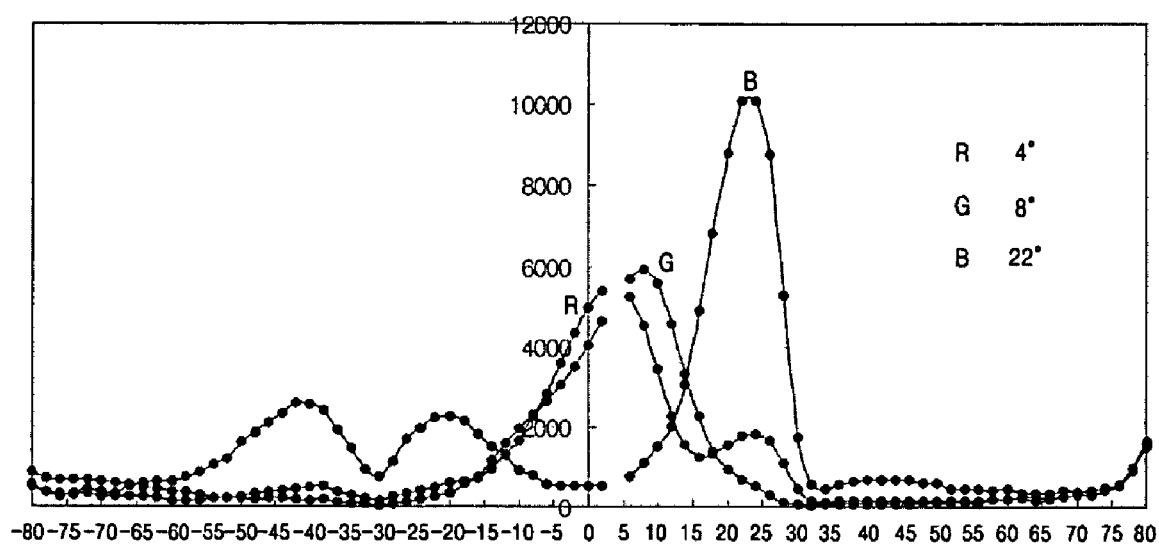
FIG. 3 is a graph illustrating a relationship between luminance distributions of the red (R) light, green (G) light, and blue (B) light and angles at which the light is emitted.

FIG. 6 illustrates simulation results when the sinusoidal patterns had periods of 460 nm, 390 nm, and 310 nm, respectively, and had the same thickness of 250 nm. Referring to FIG. 6, the red (R) light was emitted at angles of approximately −38°, −12°, 0°, 25°, and 50°, which are called peak angles. The angles were measured from an imaginary reference line perpendicular to the top surface of the light guide plate 22. The green (G) light peaked at angles of approximately −20°, −7.5°, 0°, 36°, and 57°, and the blue (B) light peaked at angles of approximately −45°, 0°, 18°, 26°, and 50°. Unlike peak angles of light emitted from a conventional light guide plate 12 illustrated in FIG. 3, the peak angles of the respective colors of light emitted from the light guide plate 22 according to the present invention are distributed over a wide range. In particular, all of the three wavelengths of light peaked at an angle of approximately 0° with respect to the imaginary reference line perpendicular to the top surface of the light guide plate 22. Therefore, a light guide plate having a micro pattern can reduce chromatic dispersion considerably. In addition, since most of the green (G) light is distributed close to an angle of 0°, a reduction in luminance is relatively low as compared with the prior art.

FIG. 7 illustrates simulation results when the sinusoidal patterns had periods of 480 nm, 420 nm, and 350 nm, respectively, and had the same thickness of 250 nm. Referring to FIG. 7, peak angles of the three different wavelengths of light were distributed over a wide range, and specifically the red (R) light, the green (G) light, and the blue (B) light all peaked at an angle of approximately 0° with respect to the imaginary reference line perpendicular to the top surface of the light guide plate 22. Also, most of the peak angles of the green (G) light were close to the angle of 0°. Accordingly, unlike the conventional art, a light guide plate according to the present invention can reduce chromatic dispersion greatly, can generate light close to white light, and can ensure a low reduction in the luminance of emitted light.

FIG. 8 illustrates simulation results when the sinusoidal patterns had periods of 420 nm and 350 nm, respectively, and had the same thickness of 250 nm. Referring to FIG. 8, even when only two patterns were used, peak angles of the two different wavelengths of light were distributed over a wide range, and specifically the red (R) light, the green (G) light, and the blue (B) light all peaked at an angle of 0° with respect to the imaginary reference line perpendicular to the top surface of the light guide plate 22. Accordingly, a light guide plate may have a combination of two, three, or more patterns having different periods.

Such a plurality of periodic patterns can be combined in various ways to form a micro pattern 23. As illustrated in FIG. 4A, a micro pattern 23 may have an enveloping surface formed along outermost edges of the first pattern with the first period $T_1$, the second pattern with the second period $T_2$, and the third pattern with the third period $T_3$. Dotted lines shown in FIG. 4A represent the respective periodic patterns, and a solid line represents the enveloping surface of the micro pattern 23 formed along the outermost edges of the periodic patterns.

Figure 4B:
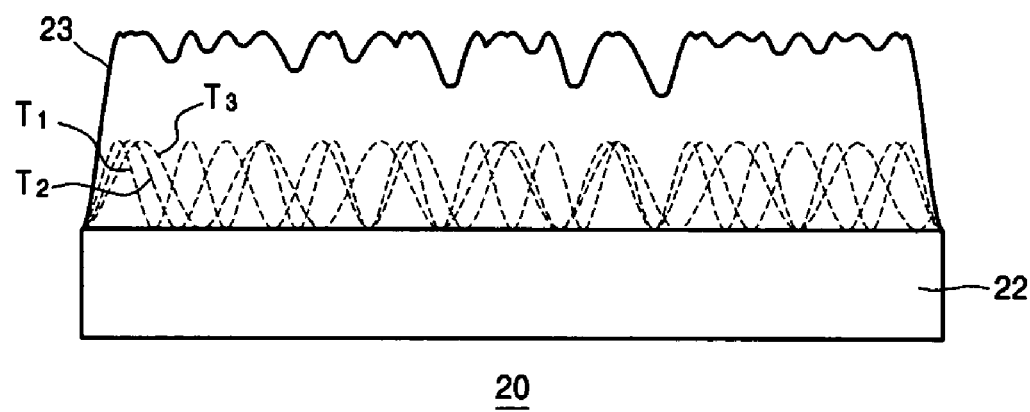
FIGS. 4B and 4C are cross-sectional views of light guide plates according to other exemplary embodiments of the present invention.

As shown in FIG. 4B, the micro pattern 23 may have a surface formed by overlapping a plurality of periodic patterns. That is, a height of the micro pattern 23 at a certain point is equal to the sum of the heights of the first pattern with a first period $T_1$, a height of the second pattern with a second period $T_2$, and a height of the third pattern with a third period of $T_3$, at the same point.

Figure 4C:
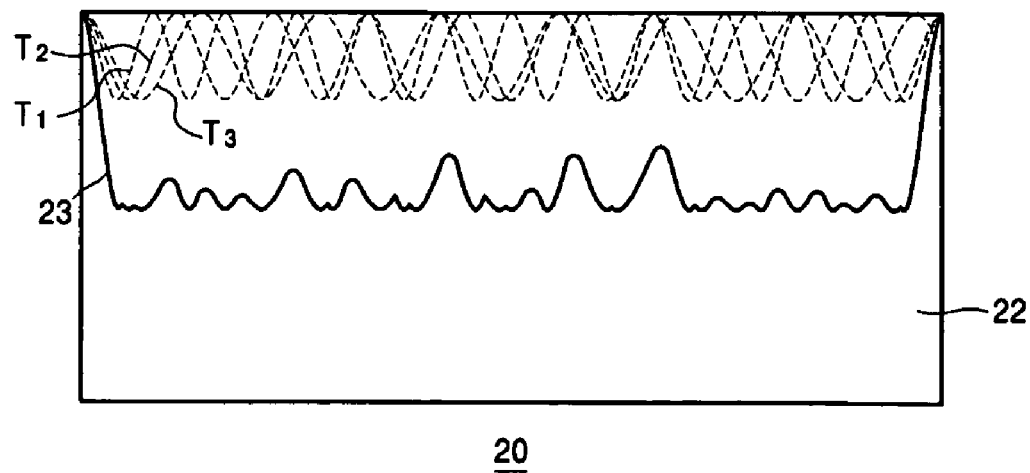

As shown in FIG. 4C, a micro pattern 23 may be formed by overlapping and inverting a plurality of periodic patterns. Accordingly, the micro patterns depicted in FIG. 4C have inverted shapes of the micro patterns depicted in FIG. 4B. That is, the micro pattern 23 illustrated in FIG. 4C may be formed inwardly by cutting the light guide plate 22 from the top surface to a depth equal to the sum of a height of the first pattern with the first period $T_1$, a height of the second pattern with the second period $T_2$, and a height of the third pattern with the third period $T_3$.

The micro pattern 23 shown in FIGS. 4B and 4C can be formed easily using well-known interference lithography. For example, a photoresist may be coated on a transparent substrate that is to be the light guide plate 22, and then may be exposed using an interference pattern formed by interfering two laser beams. Thereafter, the photoresist may be exposed again using an interference pattern with a different period. After the exposure process is repeated, the transparent substrate is etched to form such micro patterns as shown in FIG. 4C. Such micro patterns as shown in FIG. 4B can be formed by molding using the etched transparent substrate as a mold master.

Although three periodic patterns are used in FIGS. 4A through 4C, two, or four or more periodic patterns can also be used. Although the micro patterns formed as shown in FIGS. 4A through 4C have different surfaces, their functions are the same, and thus they each can reduce chromatic dispersion.

As described above, the light guide plate having multi-periodic micro patterns according to the present invention can minimize chromatic dispersion generated due to a difference in angles at which different wavelengths of light are emitted. Consequently, when the illumination apparatus for the device employing the light guide plate according to the present invention is used as a backlight unit, higher chromaticity and luminance can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light guide plate comprising a micro pattern as a top surface thereof,
   wherein a surface of the micro pattern is a combination of at least two periodic patterns having different periods,
   wherein the micro pattern is a non-periodic pattern,
   wherein each of the at least two periodic patterns is distributed over the entire top surface, and
   wherein the at least two periodic patterns are in superposition with each other.

2. The light guide plate according to claim 1, wherein the at least two periodic patterns are sinusoidal patterns.

3. A light guide plate comprising:
   a top surface; and
   a micro pattern formed on the top surface and allowing light, which is incident from a side surface of the light guide plate, to be emitted from the top surface,
   wherein the micro pattern is a combination of at least two periodic patterns having different periods to reduce chromatic dispersion of the light emitted from the top surface,
   wherein the micro pattern is a non-periodic pattern,
   wherein each of the at least two periodic patterns is distributed over the entire top surface, and
   wherein the at least two periodic patterns are in superposition with each other.

4. The light guide plate of claim 3, wherein the micro pattern comprises an enveloping surface formed along outermost edges of the at least two periodic patterns.

5. The light guide plate of claim 3, wherein the micro pattern comprises a surface formed by overlapping and summing the at least two periodic patterns.

6. The light guide plate of claim 3, wherein the micro pattern comprises a surface formed by overlapping and inverting the at least two periodic patterns.

7. The light guide plate of claim 3, wherein the at least two periodic patterns are sinusoidal patterns.

8. The light guide plate of claim 3, further comprising
a reflective plate disposed adjacent to a side surface of the light guide plate, opposite to the side surface of the light guide plate from which the light is incident, the reflective plate reflecting light which is not emitted through the top surface of the light guide plate but is emitted from the side surface of the light guide plate.

9. An illumination apparatus for a display device, the illumination apparatus comprising:
a light guide plate having a top surface on which a micro pattern is formed to emit light incident from a side surface of the light guide plate from the top surface;
at least one light source disposed at a side of the light guide plate, and emitting light;
wherein the micro pattern is a combination of at least two periodic patterns having different periods to reduce chromatic dispersion of the light emitted from the top surface of the light guide plate,
wherein the micro pattern is a non-periodic pattern,
wherein each of the at least two periodic patterns is distributed over the entire top surface, and
wherein the at least two periodic patterns are in superposition with each other.

10. The illumination apparatus of claim 9, wherein the micro pattern comprises an enveloping surface formed along outermost edges of the at least two periodic patterns.

11. The illumination apparatus of claim 9, wherein the micro pattern comprises a surface formed by overlapping and summing the at least two periodic patterns.

12. The illumination apparatus of claim 9, wherein the micro pattern comprises a surface formed by overlapping and inverting the at least two periodic patterns.

13. The illumination apparatus of claim 9, wherein the at least two periodic patterns are sinusoidal patterns.

14. The illumination apparatus of claim 9, further comprising
a reflective plate disposed adjacent to a side surface of the light guide plate opposite to the side surface of the light guide plate close to the light source, the reflective plate reflecting light which is not emitted through the top surface of the light guide plate but is emitted from the second side surface of the light guide plate.

15. The illumination apparatus of claim 9, further comprising a diffusion plate facing the top surface of the light guide plate and uniformly diffusing the light emitted from the top surface of the light guide plate.

16. The illumination apparatus of claim 9, wherein the light source is a white light emitting diode (LED).

17. An illumination apparatus, comprising:
a light guide plate comprising a micro pattern as a top surface thereof; and
at least one light source disposed at a side surface of the light guide plate;
wherein a surface of the micro pattern is a combination of at least two periodic patterns having different periods,
wherein the micro pattern is a non-periodic pattern,
wherein each of the at least two periodic patterns is distributed over the entire top surface, and
wherein the at least two periodic patterns are in superposition with each other.

18. The illumination apparatus according to claim 17, wherein the at least two periodic patterns are sinusoidal patterns.

19. An illumination apparatus, comprising:
a light guide plate;
a micro pattern formed on a top surface of the light guide plate, the micro pattern having a surface of the micro pattern a combination of at least two periodic patterns having different periods; and
at least one light source disposed at a side surface of the light guide plate,
wherein the micro pattern is a non-periodic pattern,
wherein each of the at least two periodic patterns is distributed over the entire top surface, and
wherein the at least two periodic patterns are in superposition with each other.

20. The illumination apparatus according to claim 19 wherein the at least two periodic patterns are sinusoidal patterns.

* * * * *